(12) United States Patent
Rakshit et al.

(10) Patent No.: US 11,538,088 B2
(45) Date of Patent: Dec. 27, 2022

(54) MONITORING DERIVED REQUIREMENTS FOR DEVICES AND SERVICES

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 133 days.

(21) Appl. No.: 17/132,240

(22) Filed: Dec. 23, 2020

(65) Prior Publication Data

US 2021/0110459 A1    Apr. 15, 2021

Related U.S. Application Data

(63) Continuation of application No. 16/193,862, filed on Nov. 16, 2018, now Pat. No. 10,929,914.

(51) Int. Cl.
*G06Q 30/06* (2012.01)
*G06Q 50/00* (2012.01)

(52) U.S. Cl.
CPC ......... *G06Q 30/0631* (2013.01); *G06Q 50/01* (2013.01)

(58) Field of Classification Search
CPC ............................ G06Q 30/0631; G06Q 50/01
USPC ...................................................... 705/26.7
See application file for complete search history.

(56) References Cited

U.S. PATENT DOCUMENTS

| 7,320,031 | B2 | 1/2008 | Koing et al. |
| 7,409,315 | B2 | 8/2008 | Kim et al. |
| 8,645,395 | B2 | 2/2014 | Mushtaq et al. |
| 9,105,036 | B2 | 8/2015 | Mass et al. |
| 9,177,554 | B2 | 11/2015 | Bhatt et al. |
| 9,727,925 | B2 * | 8/2017 | Subramanian ......... G06Q 50/01 |
| 10,355,319 | B1 | 7/2019 | Lim et al. |

(Continued)

FOREIGN PATENT DOCUMENTS

| CN | 102592210 A | * | 7/2012 | ........... G06F 3/0484 |
| CN | 106209959 | | 12/2016 | |
| WO | 2018129550 | | 7/2018 | |

OTHER PUBLICATIONS

ADmantX Partners With Turn to Give Enterprise Marketers and Advertisers Spot-on Contextual Data to Improve Brand Safety and Engagement Internet Wire Oct. 21, 2013: NA. retrieved from Dialog database on Jun. 28, 2021. (Year: 2013).*

(Continued)

*Primary Examiner* — Yogesh C Garg
(74) *Attorney, Agent, or Firm* — Monchai Chuaychoo; Andrew D. Wright; Calderon Safran & Cole P.C.

(57) ABSTRACT

A computer device determines requirements of a particular device/service by analyzing designated electronic communications. The computer device then monitors performance of the device/service over a period of time to determine performance of the device/service in meeting those derived requirements. An output regarding the performance of the device/service in meeting those requirements is then generated.

20 Claims, 7 Drawing Sheets

(56) References Cited

U.S. PATENT DOCUMENTS

| | | |
|---|---|---|
| 10,755,052 B2 * | 8/2020 | Deng ................. G06F 40/30 |
| 2005/0004880 A1 | 1/2005 | Musgrove et al. |
| 2007/0066297 A1 | 3/2007 | Heidari-Bateni |
| 2011/0276513 A1 | 11/2011 | Erhart et al. |
| 2015/0066803 A1 | 3/2015 | Aneja et al. |
| 2015/0310720 A1 | 10/2015 | Gettings et al. |
| 2016/0063215 A1 | 3/2016 | Zamer |
| 2016/0269533 A1 | 9/2016 | Taylor et al. |
| 2017/0188250 A1 | 6/2017 | Stevens et al. |
| 2017/0372020 A1 | 12/2017 | Govro et al. |
| 2018/0210957 A1 | 7/2018 | Altaf et al. |
| 2019/0333111 A1 | 10/2019 | Furukawa |
| 2020/0160423 A1 | 5/2020 | Rakshit et al. |

OTHER PUBLICATIONS

Nov. 16, 2018, U.S. Appl. No. 16/193,862, US 2020-0160423 A1.
Mell et al., "The NIST Definition of Cloud Computing", NIST, Special Publication 800-145, Sep. 2011, 7 pages.
List of IBM Patents or Patent Applications Treated as Related, dated Dec. 22, 2020, 1 page.

* cited by examiner

MONITORING DERIVED REQUIREMENTS FOR DEVICES AND SERVICES

BACKGROUND

The present invention generally relates to providing information regarding a device or service of interest to a user, and, more particularly, to determining and monitoring personalized user requirements of a user regarding the device or service.

When a user considers purchasing a device or service, there are generally features of that device/service that are more important than others. For example, when the user is considering purchasing new cellular network service, the quality of the networks under consideration in the places where the user typically spends time (i.e., their home, their office) is a very important factor. Similarly, if a user is considering purchasing a new vehicle, some users may regard gas efficiency as the most important feature, others may regard speed as being most important, and still others the ability of the vehicle to drive off-road. In other words, different users place different levels of importance on different aspects of performance of a device or service.

SUMMARY

In a first aspect of the invention, there is a method comprising: determining, by a computer device, personalized user requirements of a user for a device/service by analyzing electronic communications of the user; monitoring, by the computer device, performance of the device/service over a period of time to determine performance of the device/service in meeting the personalized user requirements; and automatically generating an output regarding the performance of the device/service in meeting the personalized user requirements.

In another aspect of the invention, there is a system comprising: a processor, a computer readable memory, and a computer readable storage medium located in a computer device; program instructions to determine personalized user requirements of a user for a device/service by analyzing electronic communications of the user; program instructions to determine metrics for measuring performance of the device/service in meeting the personalized user requirements; and program instructions to monitor the performance of the device/service, using the metrics, over a period of time to determine whether the device/service satisfies the personalized user requirements. The program instructions are stored on the computer readable storage medium for execution by the processor via the computer readable memory.

In another aspect of the invention, there is computer program product, comprising a computer readable storage medium having program instructions embodied therewith, the program instructions executable by a computing device to cause the computing device to: determine personalized user requirements of a user for a device/service by analyzing electronic communications of the user; monitor performance of the device/service over a period of time to determine performance of the device/service in meeting the personalized user requirements; and automatically generate an output regarding the performance of the device/service in meeting the personalized user requirements.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
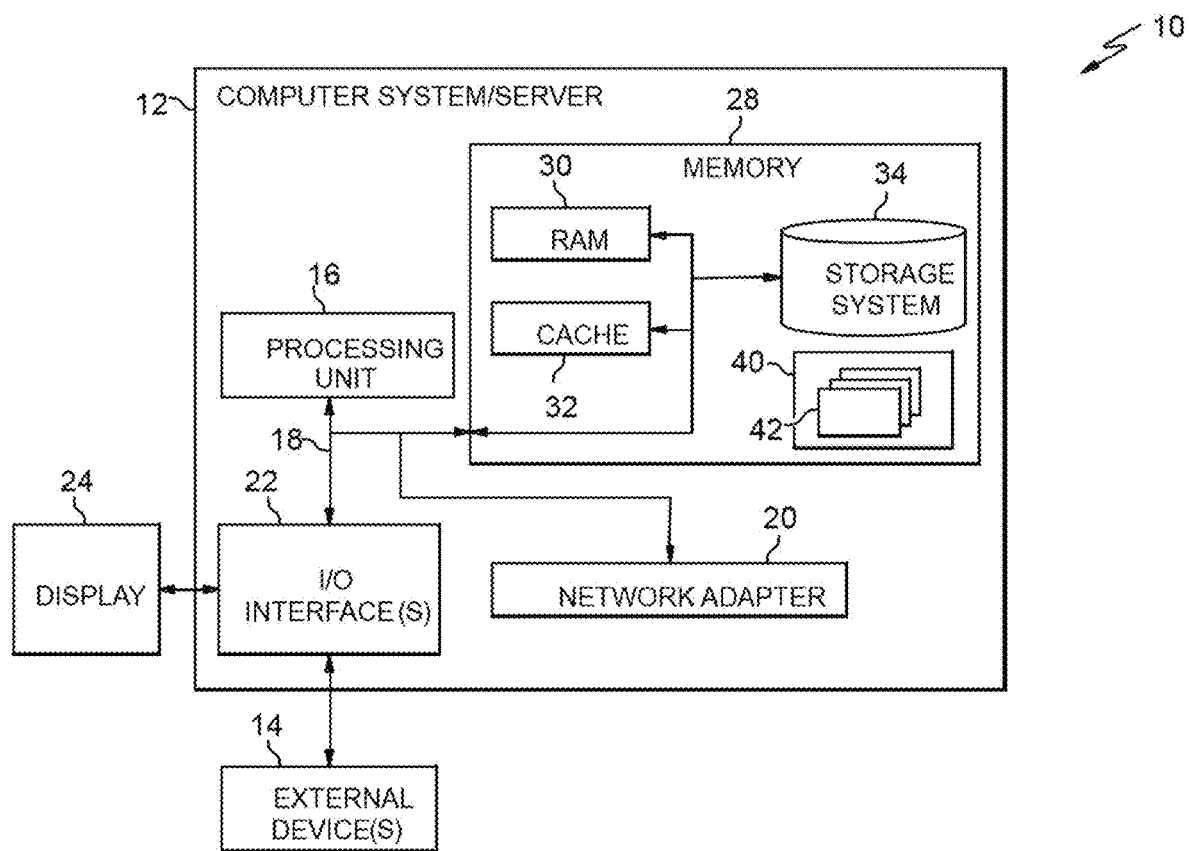
FIG. 1 depicts a cloud computing node according to an embodiment of the present invention.

The present invention generally relates to providing information regarding a device/service of interest to a user, and, more particularly, to determining and monitoring personalized user requirements of a user regarding a device/service. Aspects of the invention include deriving features that a particular user deems most important about a device/service through cognitive analysis of unstructured electronic communications, such as email messages, instant messages and social network posts. In embodiments, this takes place while the user is considering procuring the device/service in question, or after the user has already procured the device/service. Further aspects of the invention include monitoring the performance of the device/service over time, after procuring the device/service, and creating a repository as to how well the device/service is performing in meeting the user's derived user requirements. Further aspects of the invention include providing a report with insights as to how well the device/service is meeting for user's derived user requirements through a system which generates user notifications, product reviews and/or social network posts.

Typically, when a user is interested in obtaining product information regarding a device/service or service which they are considering purchasing, or otherwise procuring, they are required to conduct a search on the Internet and/or fill out information forms regarding what they are interested in with regard to the devices or services they are considering. This is a time-consuming and cumbersome way to acquire information. Further, there is generally no convenient means provided for determining how well the device/service performs in providing the features which are most important to the user.

In accordance with aspects of the present invention, information regarding personalized user requirements of a user regarding devices/services of interest are obtained by providing cognitive analysis of unstructured electronic communications of the user, without direct input from the user regarding conducting research and/or filling out information forms concerning what they are most interested in regarding a device/service. Further aspects of the present invention include monitoring the performance of the device/service over time to determine how the device/service is performing with respect to the user's derived user requirements, and providing one or more reports regarding the monitored performance.

Advantageously, embodiments of the present invention provide technical solutions to the problem of deriving technical features of a device/service which are of the most importance to a user of the device/service, and monitoring the performance of the device/service using sensors and data pertaining to the derived technical features in order to generate reports regarding the device/service performance. In implementations, the system performs an unconventional operation of deriving, by a computer device, performance requirements regarding features of a device/service using cognitive analysis of unstructured electronic communications of the user, in conjunction with monitoring, by the computer device, the performance of the device/service over a period of time to determine whether the performance of the device/service is meeting personalized user requirements of the user for the device/service in question. Aspects of the invention are implemented using devices and techniques that are necessarily rooted in computer technology, such as computer-based cognitive analysis and classification, that have no pre-computer analog. Further, aspects of the invention are implemented with particular physical sensors connected to or built into the devices being monitored, or sensors found on related devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
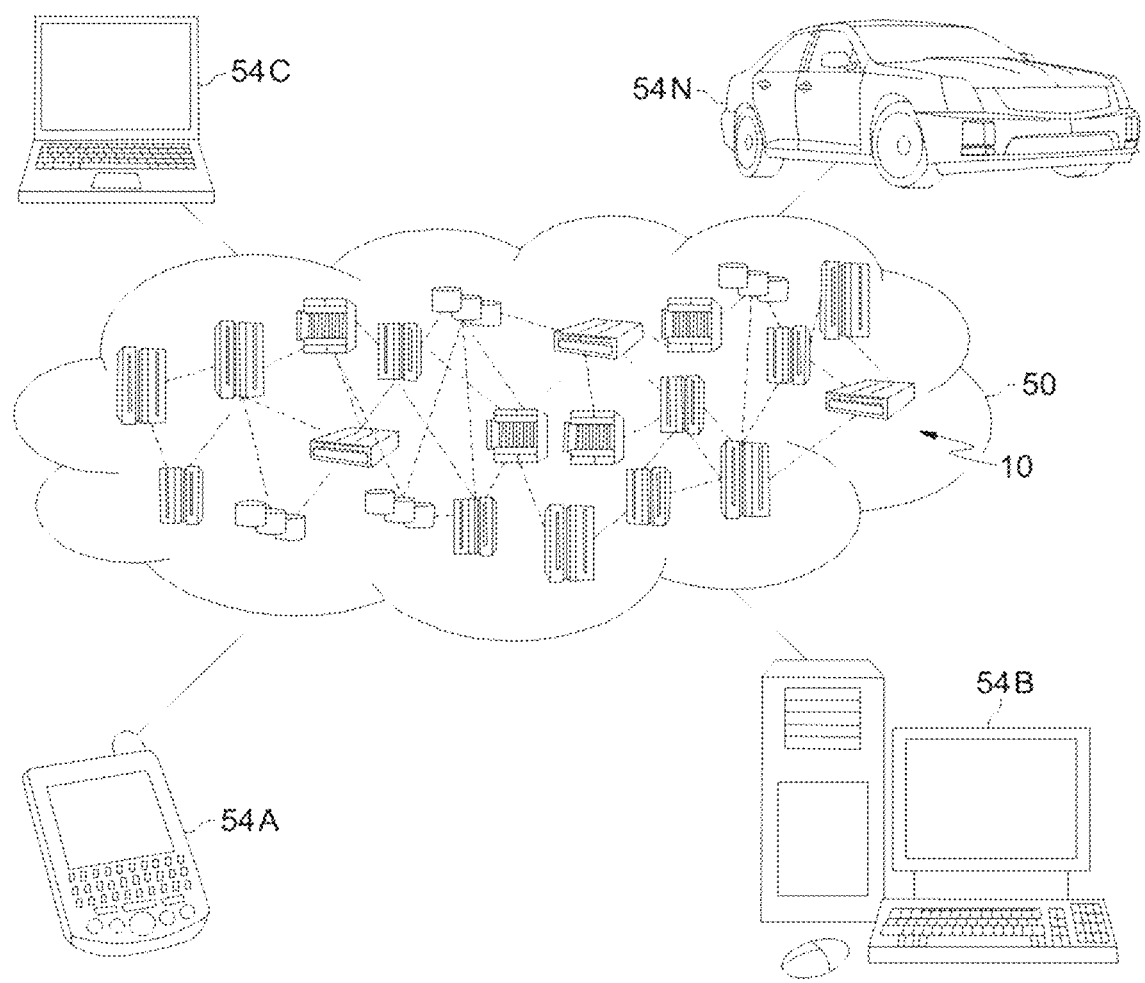
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
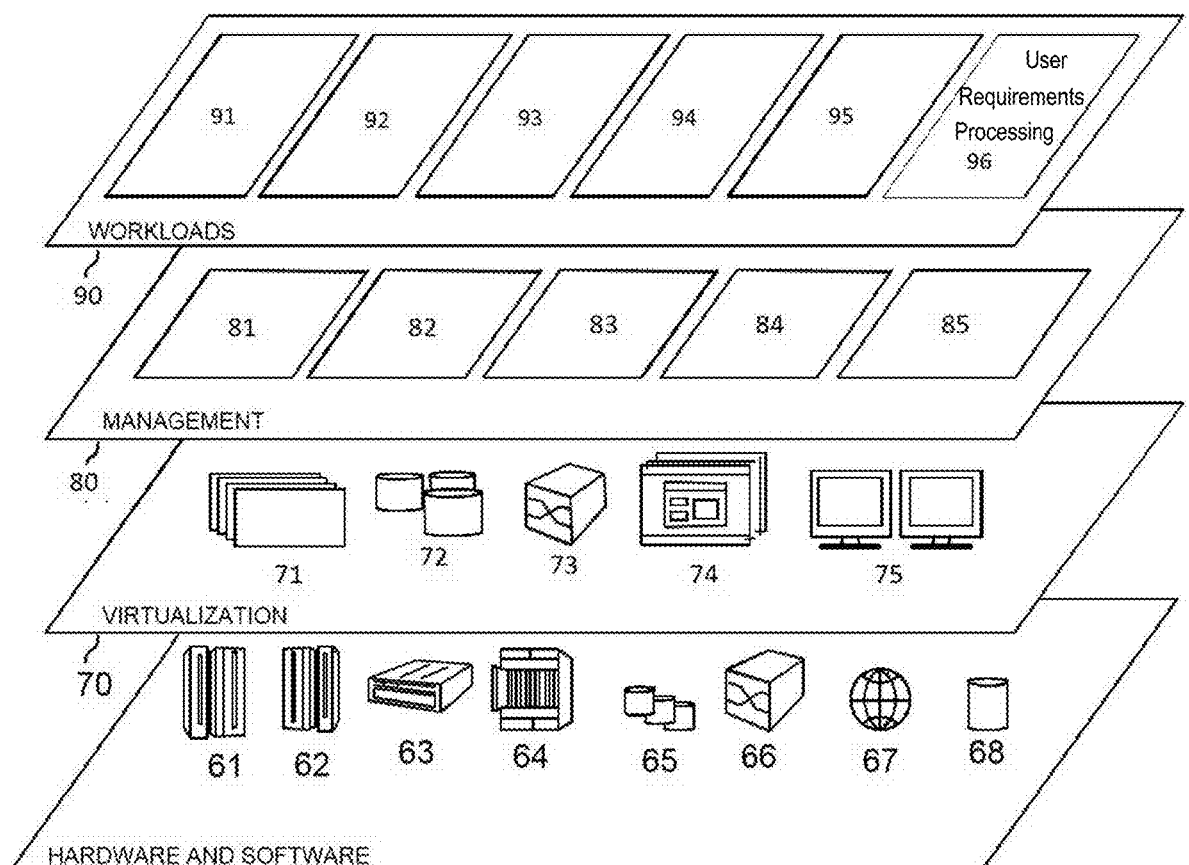
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user requirements processing 96.

Figure 4:
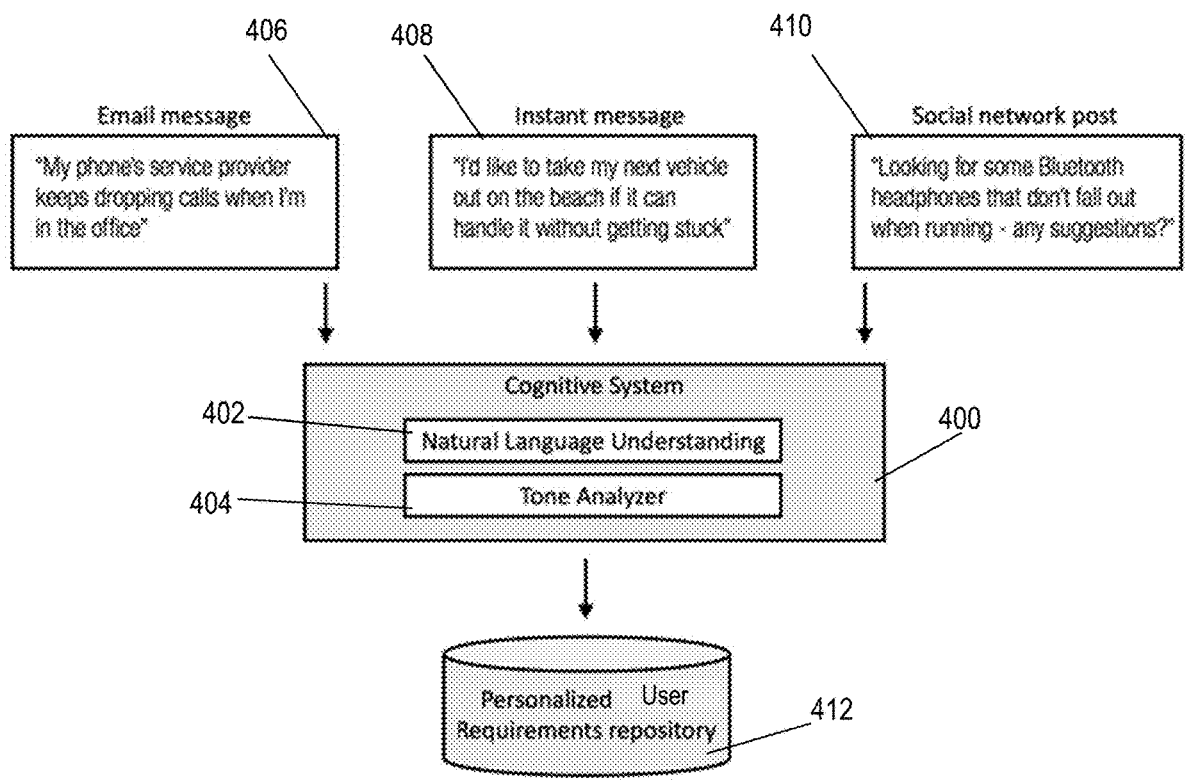
FIGS. 4-6 show block diagrams of an exemplary embodiment in accordance with aspects of the invention.
Figure 5:
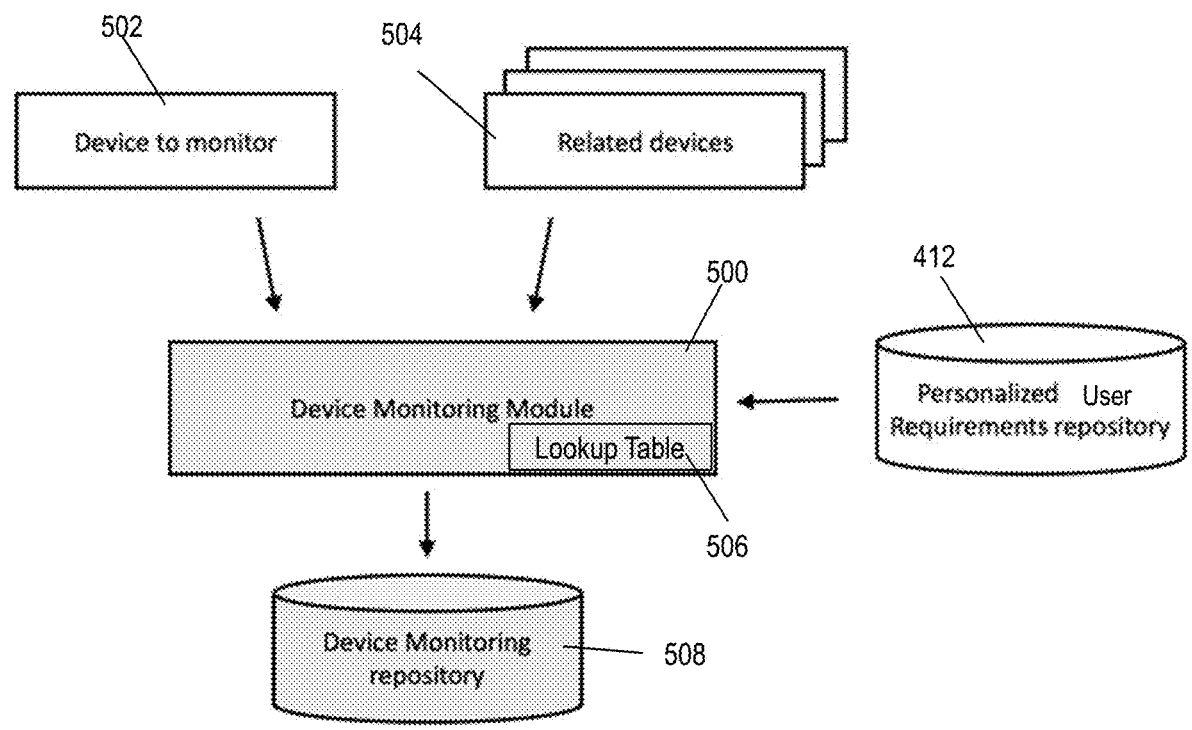
Figure 6:
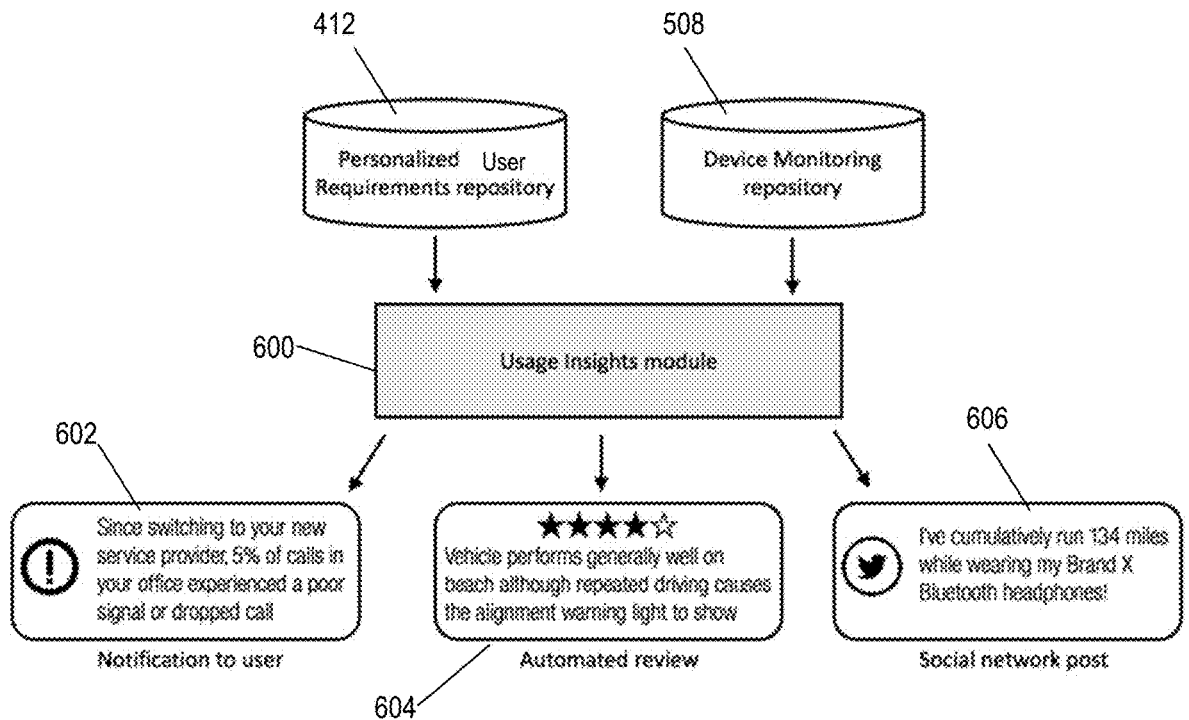

FIGS. 4-6 shows block diagrams of respective portions of an exemplary embodiment in accordance with aspects of the invention. In this embodiment the user requirements processing 96 shown in FIG. 3 is implemented by the cognitive system 400 of FIG. 4, the device monitoring module 500 of FIG. 5 and the usage insights module 600 FIG. 6. In embodiments, the cognitive system 400, the device monitoring module 500 and the usage insights module 600 are elements of a computer device having one or more components of the computer system/server 12 shown in FIG. 1. In particular, the cognitive system 400, a device monitoring module 500 and the usage insights module 600 each include one or more program modules 42 shown in FIG. 1 to implement the operations described below. In addition, according to aspects of the present invention, the cognitive system 400, the device monitoring module 500 and the usage insights module 600 are designed to operate in a cloud computing environment, such as shown in FIG. 2, to connect to remote servers via a cloud computing environment 50.

Referring to FIG. 4, the cognitive system 400 includes a natural language understanding (NLU) module 402 and a tone analyzer 404 to perform analysis on unstructured electronic communications received by the cognitive system 400. In embodiments, the cognitive system 400 receives unstructured electronic communications in the form of email messages 406, instant messages 408 and social network posts 410.

The cognitive system 400 analyzes the unstructured electronic communications 406, 408 and 410, by cognitive analysis, to determine requirements that are important to the user for a given device or service. In particular, the cognitive system 400 performs one or both of analysis using the NLU module 402 and the tone analyzer 404. The NLU module 402 analyzes text in the unstructured electronic communications to extract metadata from content such as concepts, entities, keywords, categories, relations and semantic roles. In embodiments, this NLU analysis determines the device/services which are discussed in the unstructured electronic communications, and determines user requirements for these device/services which are deemed to be important by the user.

Alternatively, or in addition, the cognitive system 400 analyzes the unstructured electronic communications 406, 408 and 410 using the tone analyzer 404. In embodiments, the tone analyzer 404 analyzes and understands emotions and communication style in text of the unstructured electronic communications. As such, the tone analyzer 404 derives the importance of particular user requirements for the device/services, which have been determined by the NLU analysis, based upon how the user expressed emotions and used communication styles to express opinions regarding the device/service in question in the text of the unstructured electronic communications.

The output of the cognitive system 400 is a list of devices/services and the personalized user requirements of the user for these devices/services. The cognitive system 400 stores this list of devices and requirements in the personalized user requirements repository 412.

In an exemplary embodiment, the cognitive system 400 determines that a personalized user requirement for a user interested in purchasing new cellular service for their mobile device is that there be no dropped calls in the user's office. In another exemplary embodiment, the cognitive system 400 determines that a personal user requirement for a user interested in purchasing a new vehicle is that the vehicle has the ability to drive on a driving beach and not get stuck. In another exemplary embodiment, the cognitive system 400 determines that a personalized user requirement for Bluetooth headphones that the user is considering buying is that the headphones can be used effectively while running. As noted above, the cognitive system uses one or both of the NLU module 402 and the tone analyzer 404 to determine the personalized user requirements, without the need for the user to perform research regarding the devices or services in question, and without the need to fill out information forms to indicate what the user regards as user requirements.

Referring to FIG. 5, a device monitoring module 500 receives inputs from sensors on the device being monitored 502, such as a purchased vehicle, and, where appropriate, sensors in related devices 504, such as the user's cell phone which can be used to provide other data while the user is in the vehicle. The device monitoring module 500 also receives personalized user requirements for the device or service being monitored from the personalized user requirements repository 412. In particular, the device monitoring module 500 monitors how the device/service performed over time to meet the user requirements of the device which have been determined for a given user. In embodiments, the device monitoring module 500 retrieves the personalized user requirements of the user for the given device/service from the personalized user requirements repository 412. The device monitoring module 500 performs ongoing monitoring and measurement for the device 502 when it is in a situation that relates to the personalized user requirements. The monitoring includes extracting information from sensors in the device being monitored 502 itself, as well as information obtained from related devices 504, where appropriate. It is noted that the monitoring can be carried out continuously, once it is determined that the device 502 is in the situation where monitoring is appropriate, for example when the user's vehicle is at a beach, or at periodic intervals.

In embodiments, in order to monitor the performance of the device or service, the device monitoring module 500 determines metrics for measuring the performance of a device/service pertaining to the personalized user requirements. In other words, the device monitoring module 500 determines metrics pertaining to the personalized user requirements it is monitoring. In order to determine metrics relating to the performance requirements being monitored, in embodiments the device monitoring module 500 uses a lookup table 506 which correlates the personalized user requirements, obtained from the personal user requirements repository 412, with predetermined metrics for monitoring these requirements. The metrics for various requirements stored in the lookup table 506 are determined from previous studies regarding the devices/services in question, as well as regarding related devices/services.

In alternative embodiments, if the lookup table 506 does not include metrics for monitoring the personalized user requirements, the device monitoring module 500 looks up metrics for other requirements in the lookup table 506 which are closely related to the personalized user requirements of the user for the particular device/service in question. In other embodiments, the device monitoring module 500 uses cognitive analysis, such as web crawling or unstructured data analysis techniques, to determine metrics for monitoring the device/service performance to determine how well the device/service is meeting the personalized user requirements. The device monitoring module 500 stores the output of the device monitoring module 500 in the device monitoring repository 508.

In an exemplary embodiment, the device monitoring module 500 monitors the requirement of no dropped calls in the user's office by monitoring the GPS location of the user's smartphone to determine when the user is in their office. Specifically, when the smartphone (corresponding to the device 502 of FIG. 5 in this example) is determined to be located at the user's office, and the user makes/receives a phone call at this location, monitoring software and the device monitoring module 500 tracks the signal strength of the cellular signal, and also notes if the call is dropped. The device monitoring module 500 stores data regarding the signal strength and whether the call was dropped in the device monitoring repository 508.

In another example, in order to monitor the user's requirement that a vehicle (corresponding to the device 502 being monitored in this example) can drive on the beach and not get stuck, the device monitoring module 500 determines the location of the user when the user is in the vehicle either directly from a sensor on the vehicle (e.g., the device being monitored 502) or through the user's mobile device (e.g., a related device 504). When the device monitoring module 500 determines that the vehicle is detected at a location consistent with a driving beach, the device monitoring module 500 begins monitoring the performance of the vehicle with regard to meeting the requirement that the vehicle not get stuck in the sand. In this example, the device monitoring module 500 obtains information from the suspension system of the vehicle (device being monitored 502) and/or from a video camera (e.g., related device 504) to determine whether the vehicle becomes stuck. In embodiments, the device monitoring module 500 stores this data regarding vehicle performance at the beach in the device monitoring repository 508.

Referring next to FIG. 6, the usage insights module 600 receives both the personalized user requirements from the personalized user requirements repository 412 and the output performance data stored in the device monitoring repository 508. The usage insights module 600 compares the user requirements with the obtained device monitoring data from the device monitoring repository 508 to provide reports regarding the performance. In particular, the usage insights module 600 compares metrics data relating to the requirements stored in the personalized user requirements repository 412 with the corresponding metrics data related to the output performance data stored in the device monitoring repository 508. In embodiments, shown in FIG. 6, the reports regarding this comparison include a notification to the user 602, an automated review 604 and a social network post 606.

In embodiments, the notifications to user 602 include notifications or email messages provided to mobile devices of the user to give the user information of a given insight related to how well the device/service has met at least one of user's personalized user requirements. In alternative embodiments, the usage insights module 600 provides an automated review 604 of the device/service, describing how well the device/service met the user's requirements. This report can be posted online, for example, on a website where a certain device/service was purchased. Alternatively, or in addition, the usage insights module 600 generates an automated social network post 606, describing how well the device/service has met the user's requirement. In embodiments, the system provides the user with an opportunity to review the social network post 606 before it is posted via the user's social network account.

Figure 7:
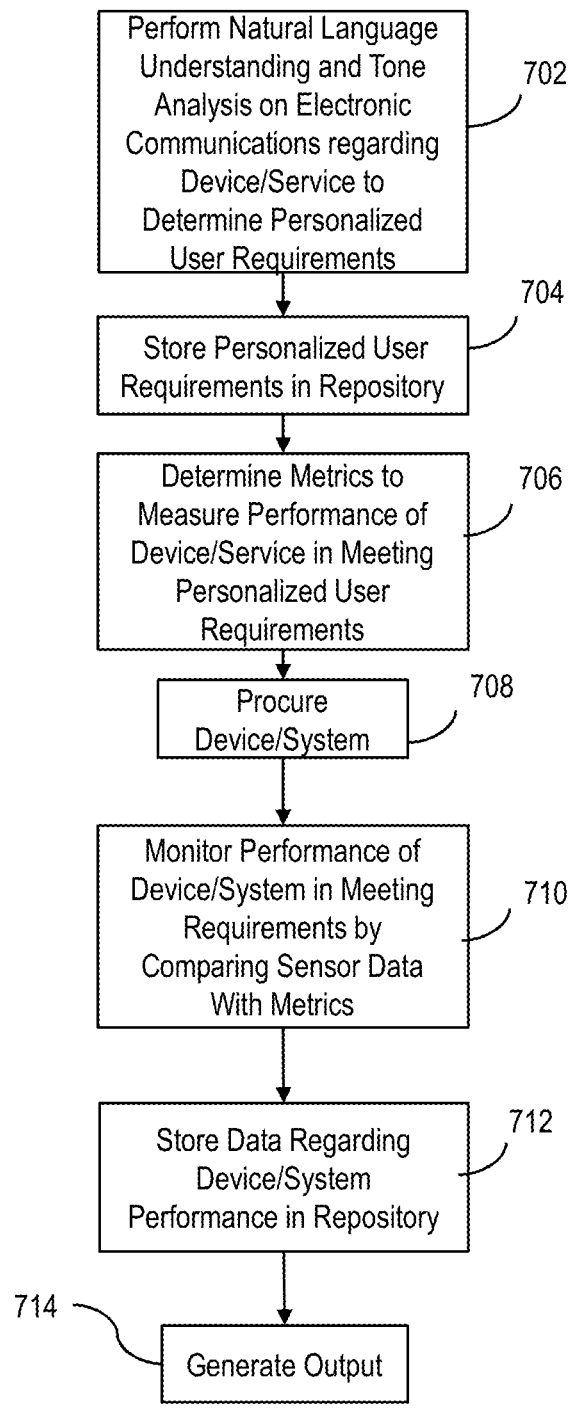
FIG. 7 shows a flowchart of an exemplary method in accordance with aspects of the invention.

FIG. 7 depicts a flowchart of an exemplary method in accordance with aspects of the invention. The steps of the method are performed in the environment of FIGS. 4-6 and are described with reference to the elements and steps described with respect to FIGS. 2 and 3.

At step 702 of FIG. 7, the cognitive system 400 of FIG. 4 performs NLU processing and tone analyzing with NLU module 402 and the tone analyzer 404, respectfully, with regard to a device or service of interest in order to determine a personalized user requirements of a user for the device or service in question. At step 704, the cognitive system 400 of FIG. 4 stores the personalized user requirements in the personalized user requirements repository 412.

At step 706, the device monitoring module 500 of FIG. 5 determines metrics for measuring performance of the device/service in question in meeting the personal user requirements, using, for example, the lookup table 506 or cognitive analysis, as discussed above. At step 708, the user procures the device/service, for example, by purchasing a new device or service, as described previously with regard to FIG. 4. In alternative embodiments, the user performs step 708 to procure the device/service before any one of the steps 702, 704 or 706.

At step 710, the device monitoring module 500 monitors the performance of the device in meeting the personalized user requirements by comparing sensor data from sensors on the device being monitored 502 and/or related devices 504 with the metrics used for monitoring the performance of the device/service in question. In step 712, the device monitoring module 500 stores the data regarding device performance in the device monitoring repository 508.

At step 714, the system automatically generates an output regarding the performance of the device/service in meeting the personalized user requirements. In embodiments, and as described with respect to FIG. 6, the usage insights module 600 uses the personalized user requirements received from the personal user requirements repository 412 and the data stored in the device monitoring repository 508 regarding performance of the device/service in question to automatically generate an output, such as the notification to user 602, the automated review 604, and/or a social network post 606.

In embodiments of the present invention, in order to address user privacy concerns, the processing unit 16 of the computer system/server 12 implements security measures at different stages of operation. For example, in embodiments, the cognitive system 400 requires opt in by the user before performing the electronic communication monitoring, and/or filtering, based on instructions by the user, regarding which electronic communications are monitored and which electronic communications are blocked from monitoring. In addition, in embodiments, the device monitoring module 500 requires opt in by the user before performing the device monitoring regarding the device to monitor 502 and the related devices 504. In alternative embodiments, the device monitoring module 500 filters data from the device to monitor 502 and the related devices 504, in accordance with instructions from the user, by blocking predetermined data from the various devices. In alternative embodiments, the usage insights module 600 requires opt in by the user before any reports are generated, and/or filters the output of the usage insights module 600, in accordance with instructions from the user, to only provide reports to predetermined recipients, while blocking reports to other predetermined recipients or unknown recipients. In further embodiments, one or more of the cognitive system 400, the device monitoring module 500 and the usage insights module 600 uses encryption to prevent data leakage to unintended and/or unknown third parties.

In summary, embodiments of the present invention provide a personalized device/service analysis including deriving a user's personalized use requirements for a device/service, based on an analysis of a user's historical usage patterns (e.g., applications used, hours use per day), and/or unstructured communications about a particular device or a class of devices (e.g., email messages or social network posts about a user's use of a current smartphone or a user's use of all the smartphones he has owned), as well as monitoring, over time, how well the particular device/service meets the user's personalized user requirements, and generating, based on the monitoring, a notification of how the particular device/service is performing. In embodiments, the notification is a system generated product review that is posted on a publicly available forum (e.g., a system automatically posting a product review on behalf of the user on a website that sells the class of devices/services being monitored).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
retrieving from a personalized user requirements repository, by a computer device, personalized user requirements of a user for a device/service, wherein the personalized user requirements of the user are derived using cognitive analysis of unstructured electronic communications corresponding to the user;
determining, by the computer device, that the device/service is in a situation where monitoring a performance of the device/service is appropriate;
monitoring, by the computer device, the performance of the device/service over a period of time to determine performance of the device/service in meeting the personalized user requirements; and
automatically generating an output regarding the performance of the device/service in meeting the personalized user requirements.

2. The method of claim 1, wherein the output includes at least one selected from a group consisting of: user notifications; product reviews; and social network posts.

3. The method of claim 1, wherein the cognitive analysis used to derive the personalized user requirements comprises using Natural Language Understanding (NLU).

4. The method of claim 3, wherein the NLU comprises extracting metadata from content in the unstructured electronic communications including at least one selected from the group consisting of: concepts; entities; keywords; categories; relations; and semantic roles.

5. The method of claim 1, wherein the personalized user requirements are determined using tone analysis to determine emotions and communication style in text of electronic communications.

6. The method of claim 1, wherein the determining, by the computer device, that the device/service is in a situation where monitoring a performance of the device/service is appropriate comprises:
identifying the device/service and the user's requirements for the device/service using Natural Language Understanding (NLU); and
determining an importance of the user's requirement using a tone analyzer.

7. The method of claim 1, wherein the monitoring is performed using data from a sensor included in the device.

8. The method of claim 1, wherein the monitoring is performed using a sensor included in a second device, other than the device being monitored.

9. The method of claim 1, further comprising storing data of the performance of the device/service in a device monitoring repository.

10. A computer program product, the computer program product comprising a computer readable storage medium having program instructions embodied therewith, the program instructions executable by a computing device to cause the computing device to:
derive personalized user requirements of a user for a device/service using cognitive analysis of unstructured electronic communications corresponding to the user;
store the personalized user requirements of the user in a personalized user requirements repository;
determine that the device/service is in a situation where monitoring a performance of the device/service is appropriate;

monitor the performance of the device/service over a period of time to determine performance of the device/service in meeting the personalized user requirements; and automatically generate an output regarding the performance of the device/service in meeting the personalized user requirements.

11. The computer program product of claim 10, wherein the cognitive analysis used to derive the personalized user requirements comprises using Natural Language Understanding (NLU).

12. The computer program product of claim 11, wherein the NLU comprises extracting metadata from content in the unstructured electronic communications including at least one selected from the group consisting of: concepts; entities; keywords;

categories; relations; and semantic roles.

13. The computer program product of claim 11, wherein the personalized user requirements are determined using tone analysis to determine emotions and communication style in text of electronic communications.

14. The computer program product of claim 11, wherein the output includes at least one selected from a group consisting of: user notifications; product reviews; and social network posts.

15. A system comprising:

a processor, a computer readable memory, and a computer readable storage medium located in a computer device;

program instructions to determine personalized user requirements of a user for a device/service, wherein the determining includes program instructions to derive the personalized user requirements using cognitive analysis of unstructured electronic communications corresponding to the user;

program instructions to determine metrics for measuring performance of the device/service in meeting the personalized user requirements;

program instructions to determine that the device/service is in a location where monitoring the performance of the device/service is appropriate, based on the cognitive analysis; and program instructions to monitor the performance of the device/service, using the metrics, over a period of time to determine whether the device/service satisfies the personalized user requirements, wherein the program instructions are stored on the computer readable storage medium for execution by the processor via the computer readable memory.

16. The system of claim 15, wherein the metrics are determined from a lookup table which includes the metrics for measuring performance for predetermined device/service requirements.

17. The system of claim 15, further comprising program instructions to automatically generate an output regarding the performance of the device/service in meeting the personalized user requirements.

18. The system of claim 15, wherein the output includes at least one selected from a group consisting of: user notifications; product reviews; and social network posts.

19. The system of claim 15, wherein the cognitive analysis used to derive the personalized user requirements comprises using Natural Language Understanding (NLU).

20. The system of claim 15, wherein the personalized user requirements are determined using tone analysis to determine emotions and communication style in text of the unstructured electronic communications.

* * * * *